(12) United States Patent
Mizoguchi et al.

(10) Patent No.: US 8,902,573 B2
(45) Date of Patent: Dec. 2, 2014

(54) FLAT BOTTOM KEYBOARD

(76) Inventors: Fumitake Mizoguchi, Kanagawa-Ken (JP); Tetsuya Ohtani, Kanagawa-Ken (JP); Takayuki Suzuki, Kanagawa-Ken (JP)

( * ) Notice: Subject to any disclaimer, the term of this patent is extended or adjusted under 35 U.S.C. 154(b) by 889 days.

(21) Appl. No.: 13/039,537

(22) Filed: Mar. 3, 2011

(65) Prior Publication Data

US 2012/0224315 A1   Sep. 6, 2012

(51) Int. Cl.
*H05K 5/00* (2006.01)
*G06F 1/16* (2006.01)

(52) U.S. Cl.
CPC ............................. *G06F 1/1662* (2013.01)
USPC ............ 361/679.09; 361/679.01; 361/679.02; 361/679.08; 361/679.17; 361/679.26

(58) Field of Classification Search
CPC ... G06F 1/1662; G06F 1/1669; G06F 3/0231; G06F 15/0225
USPC ............ 361/679.01, 679.02, 679.08, 679.09, 361/679.1, 679.17, 679.26, 679.22
See application file for complete search history.

(56) References Cited

U.S. PATENT DOCUMENTS

| 5,865,546 A * | 2/1999 | Ganthier et al. ............... 400/489 |
| 2008/0007902 A1 * | 1/2008 | Kim ............................... 361/680 |
| 2008/0124189 A1 * | 5/2008 | Hsu et al. ...................... 411/393 |

FOREIGN PATENT DOCUMENTS

| JP | 2007-80929 | 3/2007 |
| JP | 2010-86279 | 4/2010 |

* cited by examiner

*Primary Examiner* — Robert J Hoffberg
*Assistant Examiner* — Hung Dang

(57) ABSTRACT

A keyboard unit may comprise a keyboard body having a top face and a planar bottom face. The keyboard body may be adapted for installation in a laptop computer. The planar bottom face of the keyboard body may be disposed toward a bottom case of the laptop when installed therein. A plurality of key tops may be disposed on the top face of the keyboard body. A plurality of bosses may have end openings aligned at same plane as the planar bottom face.

8 Claims, 6 Drawing Sheets

US 8,902,573 B2

FLAT BOTTOM KEYBOARD

BACKGROUND OF THE INVENTION

The present invention relates generally to keyboards, and, more specifically, to flat bottom keyboards which can be used for different designs or models of notebook personal computers (hereinafter "notebook PCs").

Keyboards for desktop computers come in a package, along with the computer system units, when sold. Users can plug in the keyboard cord to a port of the computer system and then start to type on the keyboard when the desktop is working. In the case of notebook PCs, the keyboard is part of the computer system unit and cannot be separated from the system unit without dissembling the system unit.

Computer manufactures have developed different models and designs of notebook PCs to serve needs of the customers. Sometimes, keyboards have to be designed differently in order to fit different models of notebook PCs, which may increase the manufacturing cost of notebook PCs.

Therefore, it can be seen that there is a need for a common keyboard for notebook PCs of different models or designs.

SUMMARY

In one aspect, a keyboard unit comprises a keyboard body having a top face and a planar bottom face, and wherein the planar bottom face is configured to be disposed toward a bottom case of a laptop computer when installed therein.

In another aspect, a keyboard unit for use in combination with an electronic apparatus that has a housing that encloses a printed circuit board therein, the keyboard unit comprises a keyboard body having a top face and a bottom face; a plurality of key tops disposed on the top face of the keyboard body; a top frame disposed between the key tops; and a plurality of recesses under cross-points of the top frame wherein the cross-point of the top frame are located between at least three key tops.

In a further aspect, an electronic apparatus comprises a bottom case; a keyboard unit having a keyboard body, wherein the keyboard body has a top face and a bottom face, the bottom face facing the bottom case; a plurality of bosses disposed under the bottom face of the keyboard body; and a plurality of fasteners for securing the keyboard unit to the bottom case, each fastener being fastened into a corresponding one of the plurality of bosses, wherein at least one of the plurality of bosses remains unoccupied by at least one of the plurality of fasteners when the electronic apparatus is fully assembled.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise a keyboard unit which may be used for various models or designs of a notebook PC. More specifically, the notebook keyboard unit may be mounted to a bottom case of a notebook PC with a plurality of fasteners. The keyboard unit may have a plurality of non-protruding bosses on its bottom plate to receive the plurality of fasteners. Because internal hardware size and layout may differ in each model of the notebook PC, the fastener positions may vary. Bosses at different positions of the keyboard unit may be used to receive fasteners at different positions in each model of notebook PC such that a common keyboard may be used for different models of the notebook PC. At least one boss may remain unoccupied by at least one fastener when the electronic apparatus is fully assembled. The non-protruding bosses may allow the keyboard unit to snuggly fit to the internal structure of the notebook PC, such as a printed circuit board.

Figure 1:
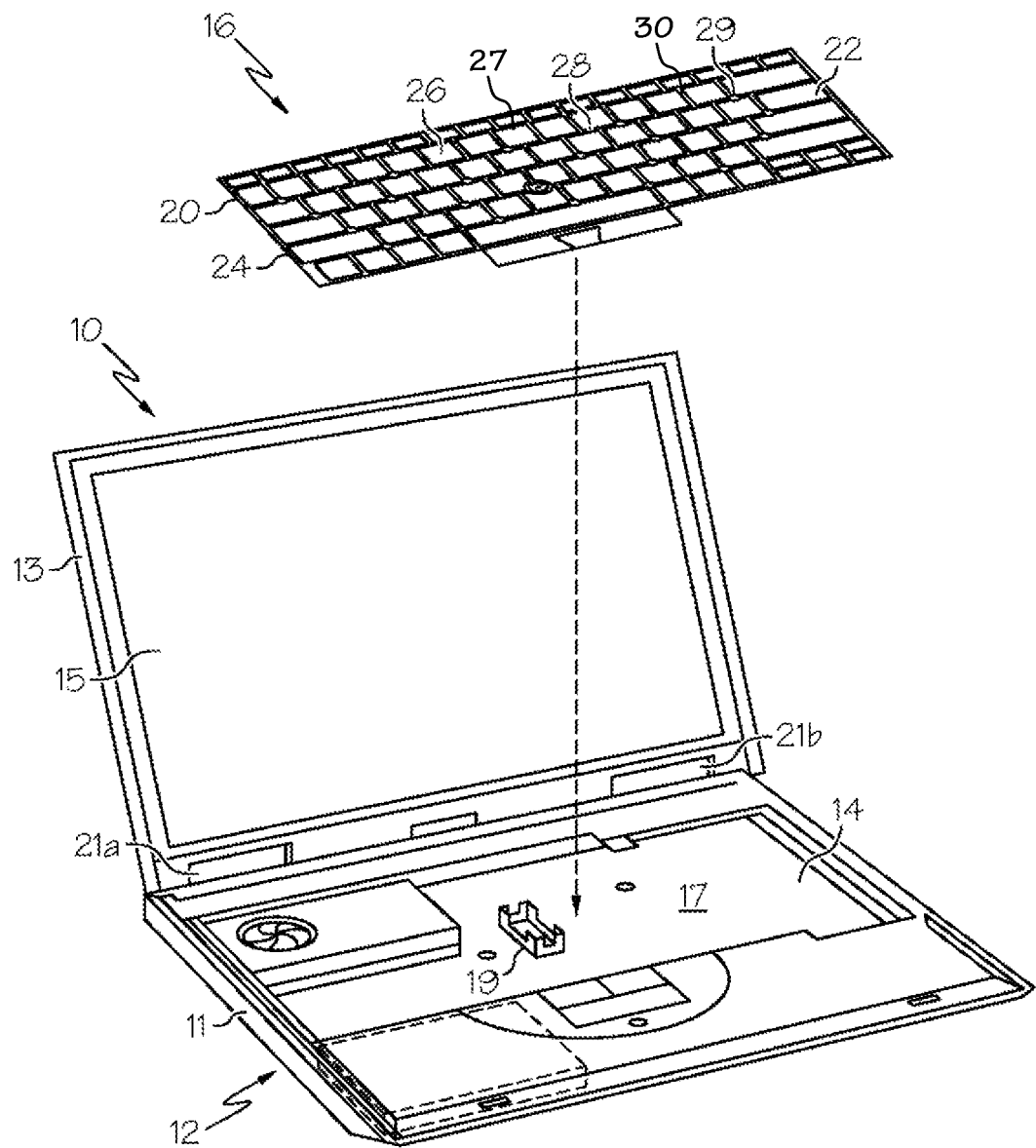
FIG. 1 is an exploded perspective view of an exemplary embodiment of a notebook PC.

FIG. 1 is an exploded perspective view of an exemplary embodiment of a notebook PC 10. The notebook PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C. The notebook PC 10 may have a liquid crystal display (LCD) 15 accommodated in a display casing 13. A bottom case 11 may have a bottom wall 12 (also shown in FIG. 4) and a recessed portion 14 opposing the bottom wall 12. The bottom case 11 may further accommodate system devices, such as a printed circuit board (PCB) 17. A keyboard unit 16 may be adapted for installation in a laptop computer. The keyboard unit 16 may be attached to the bottom case 11 so as to cover the recessed portion 14 of the bottom case 11. The bottom case 11 and the display casing 13 may be openably coupled to each other via hinge portions 21a and 21b.

Still in FIG. 1, the keyboard unit 16 may comprise a keyboard body 20 which includes a top face 22 and a planar bottom face 24. The planar bottom face 24 of the keyboard body 20 may be disposed toward the bottom case 11 or the printed circuit board 17 of the notebook PC 10 when installed therein. A plurality of key tops 26 may be disposed on the top face 22 of the keyboard body 20. The key tops 26 may include multiple sides 27. The keyboard unit 16 may further include a top frame 28 which may be disposed between the key tops 26. The top frame 28 may include multiple elongated portions 30 between the sides 27 of the key tops 26. The top frame 28 may have a plurality of cross-points 29 located between key tops 26, i.e., between at least three key tops, for example. The cross-points 29 may be located at the intersection of two or more of the elongated portions 30. The keyboard unit 16 may be connected to a terminal part 19 of the printed circuit board 17.

Figure 2A:
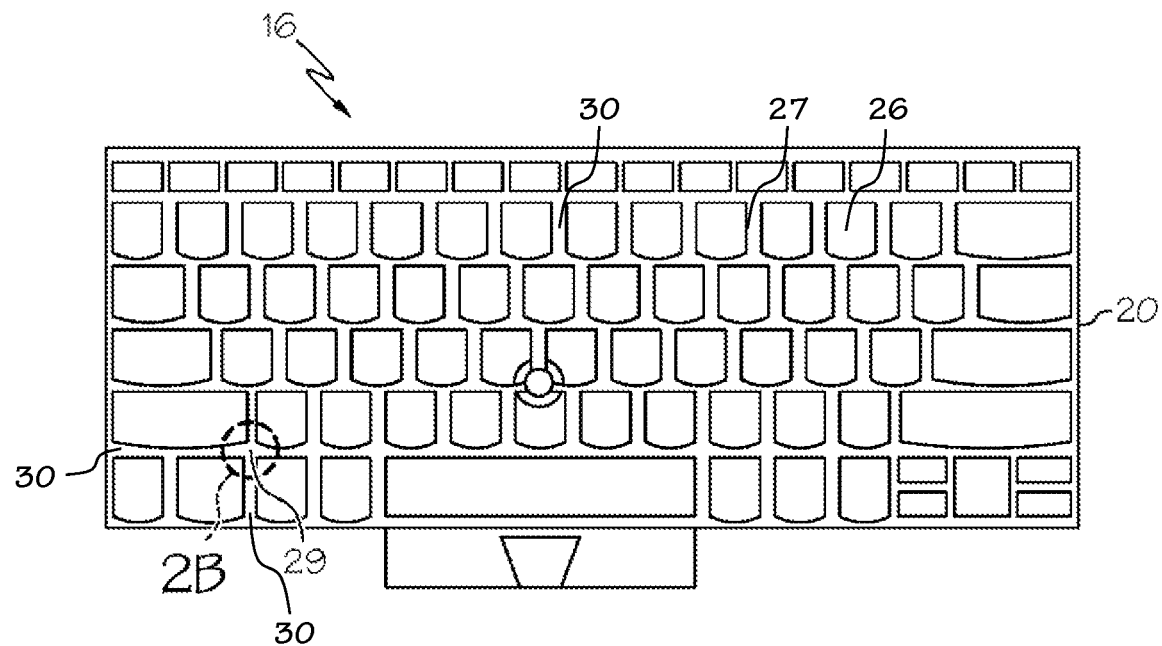
FIG. 2A is a plan view of a keyboard unit of the notebook PC of FIG. 1.
Figure 2B:
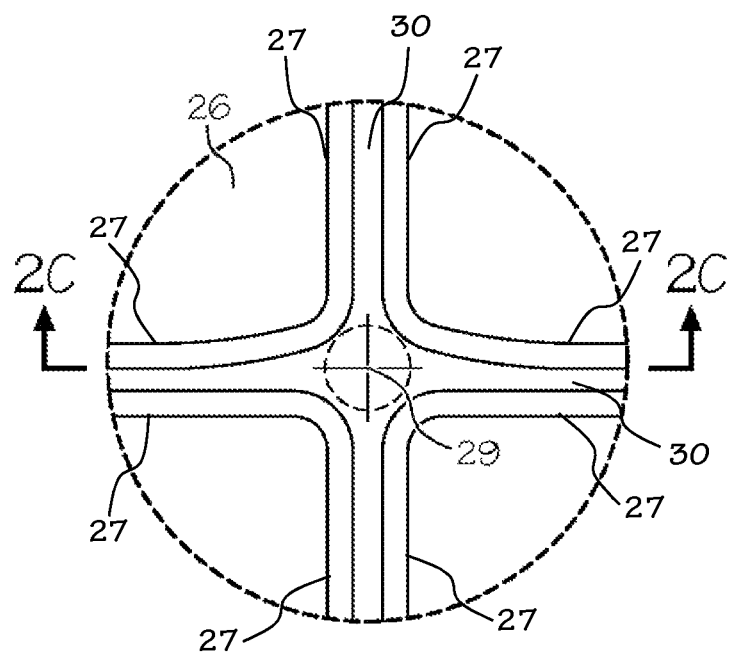
FIG. 2B is an enlarged detailed view of part of the keyboard unit taken along circle A of FIG. 2A.
Figure 2C:
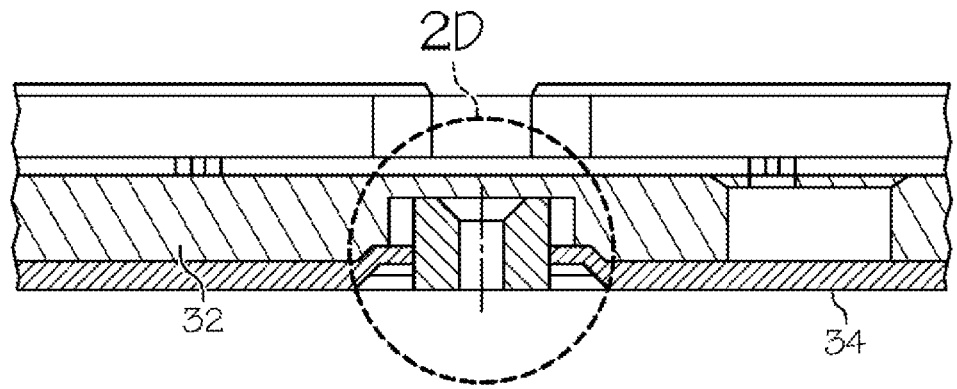
FIG. 2C is a cross sectional view of part of the keyboard unit taken along line B-B of FIG. 2B.

FIG. 2A depicts a plan view of the keyboard unit 16 of the notebook PC 10. The keyboard unit 16 may be called a frame mounted keyboard, isolation keyboard, island keyboard, or chiclet keyboard. FIG. 2B is an enlarged detailed view of part of the keyboard unit 16 taken along circle A of FIG. 2A. The cross-points 29 may be disposed in the center of four key tops 26. Alternatively, the cross-points 29 may be disposed in the center of three key tops (shown in FIG. 1). Referring to FIG. 2C, a planar bottom plate 34 may form the bottom wall 12 of the casing 11 of the keyboard unit 16.

Figure 2D:
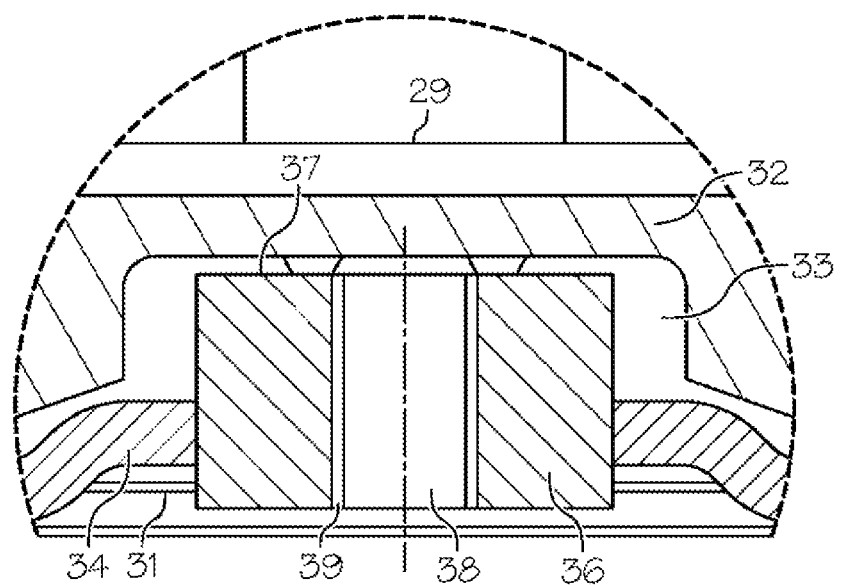
FIG. 2D is an enlarged detailed view of part of the keyboard unit taken along the circle C of FIG. 2C.

Referring to FIG. 2D, the top frame 32 may have a plurality of recesses 33 under the cross-points 29. A boss 36 may protrude into the recess 33 with one end 37 of the boss 36 secured to the top frame 32. An open end 39 of the boss 36 may be aligned at the same plane as the bottom plate 34. The boss 36 and the bottom plate 34 may be made of a metal, such as aluminum, for example. The bottom plate 34 and the top frame 32 may help secure the boss 36. The boss 36 may have a threaded hole 38 therein. The threaded hole 38 may receive a fastener at a predetermined depth. In an exemplary embodiment, the fastener may be a screw 44 (shown in FIG. 4), for example. In alternative embodiments, the fastener may be a pin, a rod, a hook or the like.

Figure 3A:
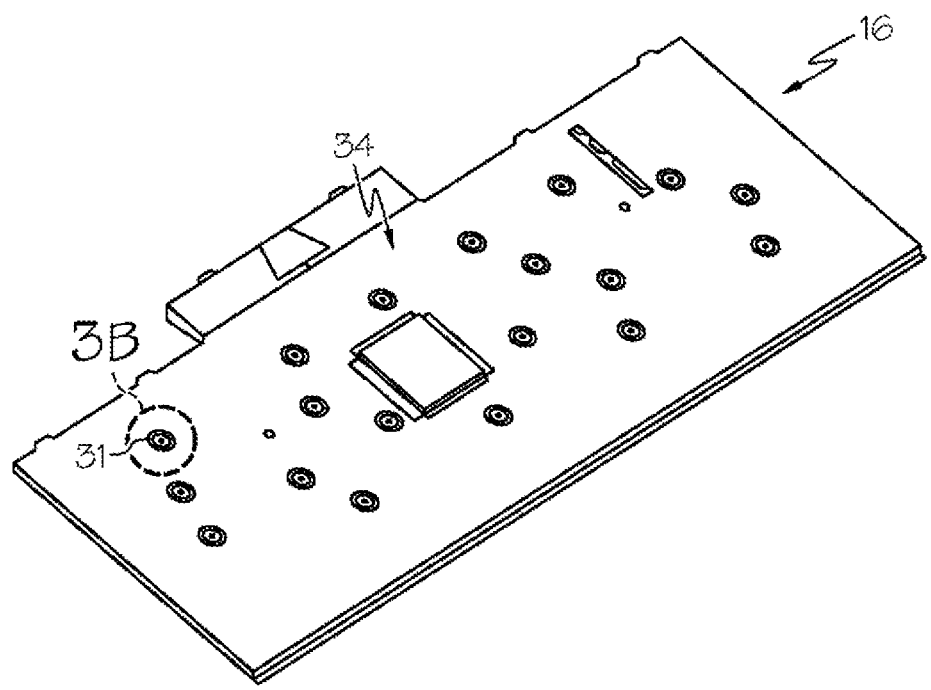
FIG. 3A is a perspective view of the bottom side of the keyboard unit shown in FIG. 2A and FIG. 1.
Figure 3B:
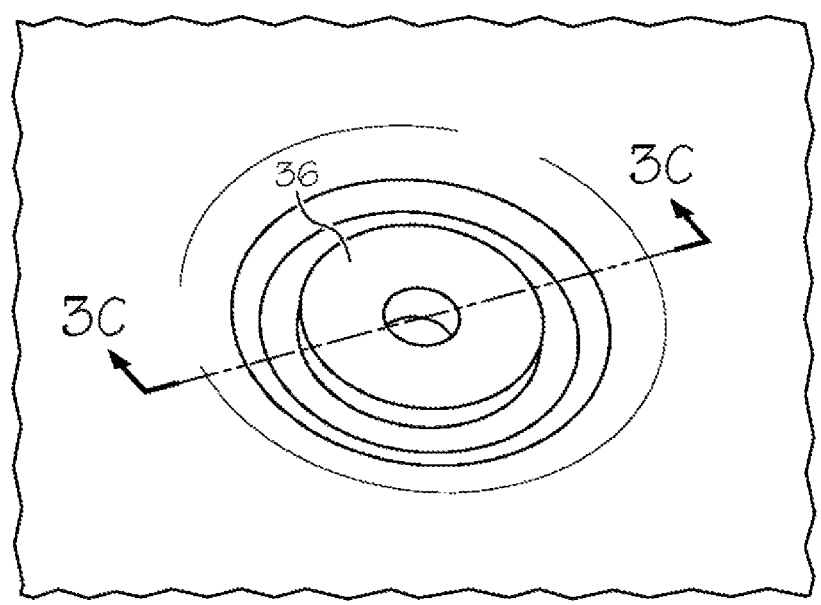
FIG. 3B is an enlarged detailed view of part of the bottom face of the keyboard unit shown in FIG. 3A taken along circle D.
Figure 3C:
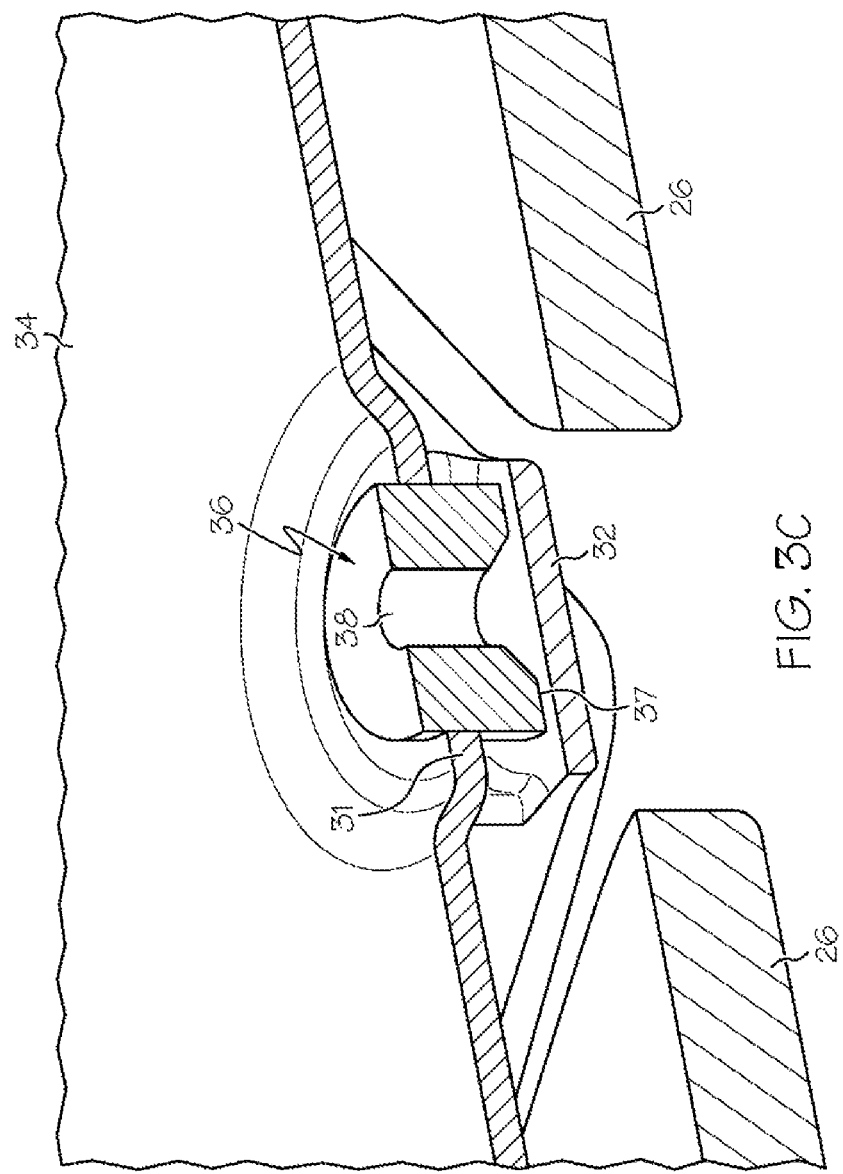
FIG. 3C is a cross sectional view of part of the keyboard unit taken along line A-A of FIG. 3B.

Referring to FIG. 3A, there may be a plurality of recesses 31 on the planar bottom face 24. The recesses 33 of the top plate 32 may be aligned with the recesses 31. In one exemplary embodiment, the recesses 33 and 31 may be coaxial. In another exemplary embodiment, the recesses 33 and 31 may be situated in such a position that helps to secure the boss 36. Referring to FIG. 3B, each recess 31 may be protruded into by the corresponding boss 36. The open end of the boss 36 may not extend beyond the plane of the bottom face 24. The bottom face 24 may be substantially flat except for a plurality of recesses 31. Referring to FIG. 3C, in an exemplary embodiment, the boss 36 may be cylindrical in shape. In alternative exemplary embodiments, the boss 36 may be in other shapes.

Figure 4:
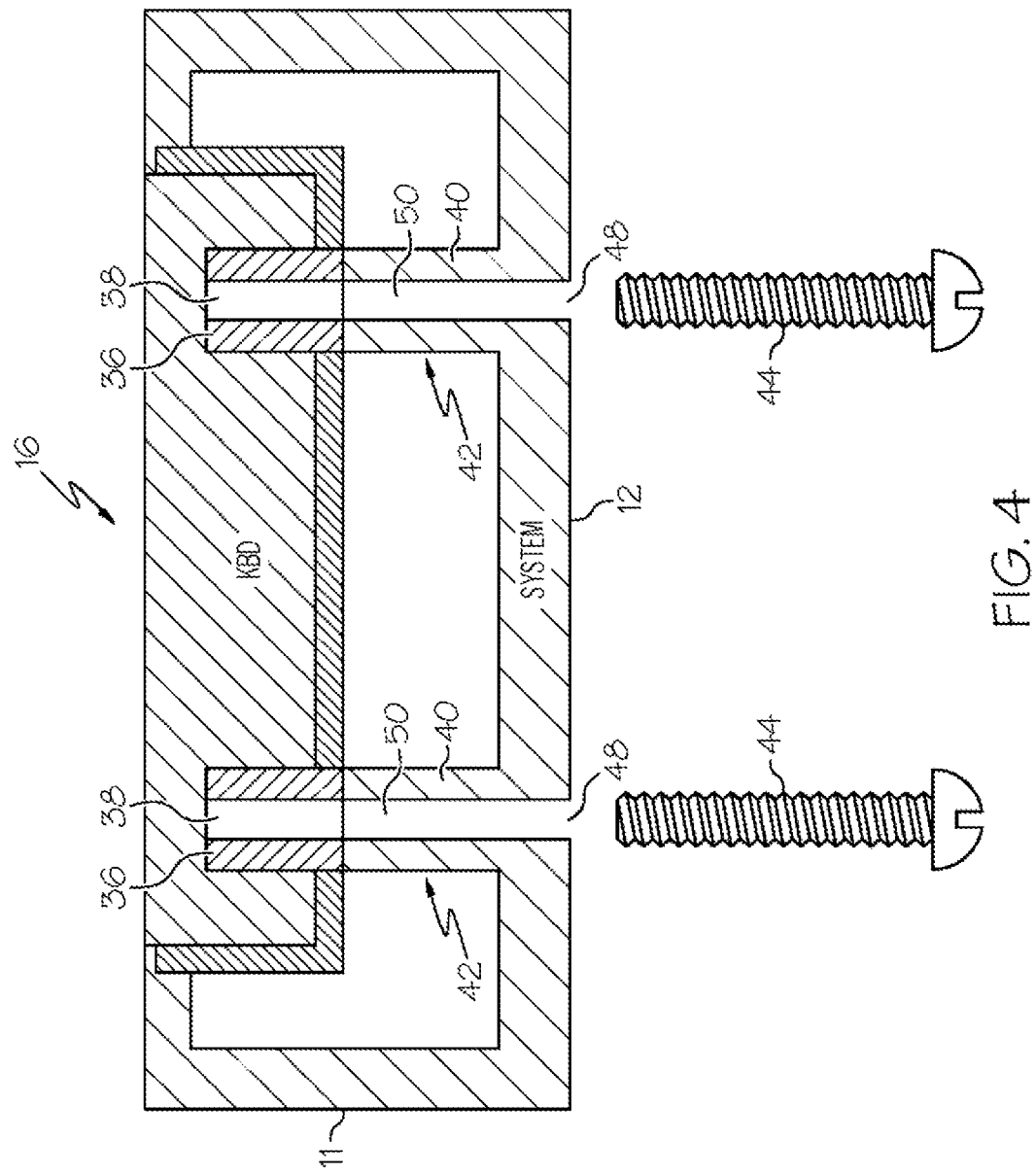
FIG. 4 is a schematic view of an assembly of the keyboard unit, a bottom case, and fasteners according to an exemplary embodiment.

FIG. 4 is a schematic view of an assembly of the keyboard unit 16, the bottom case 11, and fasteners 44 according to an exemplary embodiment. A system boss 40 may include a plurality of bosses 42 on the printed circuit board 17 (shown in FIG. 1). The system boss 40 may have threaded holes 50 therein. The bosses 42 on the printed circuit board 17 may be coaxial with the bosses 36 on the keyboard unit 16. The bottom case 11 may include a plurality of apertures 48. Each fastener 44 may penetrate into the corresponding apertures 48 in a direction from the bottom wall 12 of the bottom case 11 toward the keyboard unit 16 mounted on the bottom case 11. The fasteners 44 may be fastened into the threaded holes 38, 50 of the corresponding bosses 36, 42 at a predetermined depth.

In some embodiments, the electronic apparatus may be a personal digital assistant (PDA), a web tablet, a wireless telephone, a wireless headset, an instant messaging device, an access point, or other device that may use the same kind of keyboard.

It should be understood, of course, that the foregoing relate to exemplary embodiments of the invention and that modifications may be made without departing from the spirit and scope of the invention as set forth in the following claims.

We claim:

1. A keyboard unit comprising:
a plurality of keys, each key having multiple sides;
a top frame including a top surface, a bottom surface, multiple elongated portions between the sides of the keys, and cross-points where one of the multiple elongated portions intersects another of the multiple elongated portions, the bottom surface including multiple recesses, each recess under a cross point;
a bottom plate including multiple recesses, and a planar bottom face configured to be disposed toward a bottom case of a laptop computer when installed therein
a plurality of bosses fixedly connecting the top frame with the bottom plate, and including end openings terminating at a plane defined by the bottom plate, the bosses positioned within a recess of the bottom surface of the to frame and within a recess of the bottom plate.

2. The keyboard unit of claim 1, wherein the bosses have threaded holes configured to receive a fastener at a predetermined depth.

3. The keyboard unit of claim 2, wherein the keyboard unit is configured to be installed in a laptop bottom case, the laptop bottom case having a plurality of keyboard mounting holes formed therein, the plurality of keyboard mounting holes aligning with threaded holes of some of the bosses.

4. An electronic apparatus comprising:
a display
a bottom case rotatably coupled to the display and including a plurality of apertures;
a keyboard unit including,
(a) a plurality of keys, each key having multiple sides,
(b) a top frame including a top surface, a bottom surface, multiple elongated portions between the sides of the keys, and cross-points where one of the multiple elongated portions intersects another of the multiple elongated portions, the bottom surface including multiple recesses, each recess at a cross point,
(c) a bottom plate including multiple recesses, and a planar bottom face configured to be disposed toward a bottom case of a laptop computer when installed therein, and
(d) a plurality of bosses fixedly connecting the top frame with the bottom plate, and including end openings terminating at a plane defined by the bottom plate, the bosses positioned within a recess of the bottom surface of the top frame and within a recess of the bottom plate and
a plurality of fasteners fixedly connecting the keyboard unit to the bottom case, each of the plurality of fasteners passing through one of the plurality of apertures in the bottom case and fastening into a corresponding one of the plurality of bosses, and wherein
at least one of the plurality of bosses remains unoccupied by any of the plurality of fasteners when each of the plurality of apertures of the bottom case contain one of the plurality of fasteners.

5. The electronic apparatus of claim 4, wherein each boss has a threaded hole therein.

6. The electronic apparatus of claim 4, wherein the fasteners comprise screws.

7. The electronic apparatus of claim 4, wherein the bottom case further comprises a bottom wall including the plurality of bottom wall apertures, each aperture being penetrated through by one of the plurality of fasteners.

8. The electronic apparatus of claim 4, wherein the bottom case further comprises a printed circuit board, wherein the printed circuit board further includes a plurality of system bosses, each system boss being penetrated through by one of the plurality of fasteners.

* * * * *